United States Patent

[11] 3,567,162

| [72] | Inventor | James M. Lea<br>Seattle, Wash. |
|---|---|---|
| [21] | Appl. No. | 783,461 |
| [22] | Filed | Dec. 9, 1968 |
| [45] | Patented | Mar. 2, 1971 |
| [73] | Assignee | The Boeing Company<br>Seattle, Wash. |

[54] FIRE STOP INSULATION
2 Claims, 3 Drawing Figs.

| [52] | U.S. Cl. | 244/121 |
|---|---|---|
| [51] | Int. Cl. | B64c 1/10 |
| [50] | Field of Search | 244/119, 121; 52/404, 406, 407; 117/126; 263/50 |

[56] References Cited
UNITED STATES PATENTS

| 2,095,626 | 10/1937 | Bassett et al. | 244/119.5 |
| 2,123,869 | 7/1938 | Walker | 52/406 |
| 2,409,951 | 10/1946 | Nootens | 52/404 |
| 2,633,433 | 3/1953 | Hollenberg, Jr. | 117/126 |
| 3,058,704 | 10/1962 | Bergstedt | 244/119 |
| 3,062,678 | 11/1962 | McCluer | 117/126 |
| 3,435,581 | 4/1969 | Ahlqvist | 52/407 |

*Primary Examiner*—Milton Buchler
*Assistant Examiner*—Steven W. Weinrieb
*Attorneys*—Glenn Orlob and Nicolaas DeVogel

ABSTRACT: An aircraft wall-fuselage construction containing an insulation material which material is formed in an accordion pleated or corrugated fashion and positioned with its ridges towards the interior wall and exterior wall or fuselage alternately. When a rupture, crack or puncture is caused in the wall structure by an aircraft crash, the insulation will unfold, cover and shield the caused opening so that flames, smoke and harmful fluids, etc. cannot enter the interior of the aircraft. A layer of fire-resistant material has been added to the insulation so that a fire-stop shielding quality is obtained.

PATENTED MAR 2 1971

3,567,162

INVENTOR:
JAMES M. LEA
BY
AGENT

FIRE STOP INSULATION

BACKGROUND OF THE INVENTION

1. Field of the Invention

This invention relates to a fire shielding material and in particular relates to a different configuration of the insulation material used in aircraft wall structures whereby the material is arranged in such a manner that a fire-protective shield, in case of aircraft accidents will be unfolded so that the cabin interior is protected from exterior flames.

2. Description of the Prior Art

In a conventional sound proofing and thermal insulating art, especially in regard to aircraft construction, the insulation batts or blankets are normally positioned parallel to the airplane skin and several batts or blankets are disposed on top of one another to fill the air space between the frames and the interior aircraft panels mounted on the frames. The insulation is loosely fastened to the airframe circumferentials.

However, the combination of an insulation material folded into a corrugated or a zigzag configuration and adapted to be expanded to cover openings in the wall of the fuselage or skin structure of aircraft to prevent exterior flames from reaching the interior, has not been found in the prior art.

SUMMARY OF THE INVENTION

The present invention relates to a protective means to prevent flames and smoke from an outside fire gaining access to the interior of an airplane or the like by draping a shield across openings which may be caused in the wall structure. To achieve the desired results, an insulation batt or blanket of material having fire-resistant qualities is folded into a corrugated or zigzag configuration and positioned within the spaces existent in the aircraft wall structure. In the preferred embodiment the batt is provided with a cover that has an improved fire resistant quality. Thus, a thin layer of fire-resistant material which will only comprise a small percentage of the total thickness is disposed onto the outside surface of the fire-stop insulation material positioned next to the outer skin or fuselage.

During a crash landing or similar type of accident, quite frequently the body structure, especially between frames, will be punctured or cracked and thus cause an access between the interior area of the aircraft and the outside. An open fuel fire may occur at the outside and flames and smoke will enter the interior of the aircraft. However, in accordance with the present invention, the fire-stop material disposed in the aircraft wall will prevent an access to the interior of the aircraft, since the insulation material which has been folded in a zigzag configuration will unfold and drape across or cover the opening formed within the skin structure and thus prevent the flames and smoke from reaching the interior of the aircraft. The fire-stop insulation is not loosely fastened between the frame circumferentials as is the normal procedure of installing conventional insulation or soundproof material. The fire-stop insulation material will be securely fastened to the frames so that the material will unfold when the two frames are separated from one another at a further than normal distance and so that the material will form a continuous closure from frame to frame.

The insulation batts or blankets are made from a variety of materials, such a glass wool, cotton, balsa, or other fibrous materials, all of which are of a generally loose or fluffy character. Without weakening the insulating or sound-absorbing qualities, the present invention uses this material preferably with some additional fire-resistant material to achieve also a fire-protective quality. Furthermore, as mentioned above, the existing installation method of the batt or blanket is eliminated. The fire-stop insulation material comprises one blanket which is now accordion pleated and inserted as a unit between two frames and thereafter securely fastened to the frames. When the fuselage is broken or punctured, due to a crash, the fire-stop material will be able to expand easily, since no stresses or tensions are existent. In some airplane crashes it has been known that the space between the frames at certain locations may be enlarged several times the standard 20 inches distance. In conventional aircraft structures this would lead to an access between the interior and exterior so that the flames, smoke and other harmful or dangerous gases or fluids can enter the interior, and as a result make the cabin unsurvivable.

Therefore, the present invention provides for a new method of installing fire-stop insulation blankets as well as a new material with fire-resistant qualities which is shaped or folded in a predetermined way in order to enhance the safety of passengers in aircraft during catastrophic crash landings.

In general and most important, the fire-stop material will prevent or delay temporarily the harmful condition of the surrounding environment from entering the interior of the aircraft cabin and thus killing or injuring the passengers during a crash landing.

As mentioned above, the conventional insulation material should preferably be improved by the addition of a fire-shielding material. In other words, a material that does not burn or melt during a fire. The fiberglass used in the conventional batts will melt at about 800° F. and the flame from an open fuel fire as experienced during crash landings will be about 1700° F. Therefore, the fire-stop material must have an improved fire-resistance which is superior to the conventional insulation materials. A fire-resistant material such as astroquartz or any other convention material could be used that has been tested to produce the desired results. Since there are various materials on the market which stand up to a 1700° F. temperature, it becomes more or less a matter of choice which material to use while keeping in mind the thickness of the total fire-stop material required.

During special tests a four-inch thick blanket of fire-stop material 20 inches wide was used in the ceiling of the 747 airplane. Assuming that the pleated blanket is .2 inch thick, the total width of the blanket would be about 30 feet. For a 2¼ inches thick unit of fire-stop insulation material as proposed for the sidewalls of the 747 aircraft, the blanket could extend to a width of 16 feet. For a 1¼ inches thick fire-stop insulation unit which was proposed for the cargo compartment, a unit having a width of approximately 20 inches would extend to 8 feet. Thus, if the fuselage only rips open, the blanket would drape across the gap. However, if a body section is torn completely apart and if the center pleat of the blanket is made weaker by perforation or some other means and thus tears that area, there would be still a 15 foot wide blanket on each side which theoretically would drape across the open end of the body fuselage sections. In other words, a beneficial result of the fire-stop insulation material can be recognized even during a severe accident.

It is therefore an object of the present invention to provide a fire-stop material which replaces the conventional insulation and soundproofing material by a predetermined disposed and fastened material having at least the same qualities as the conventional insulation and soundproofing material as well as an additional fire-preventive of fire-shielding feature.

It is another object of the present invention to provide for a new method of inserting an insulation material having fire-protective qualities in an accordion pleated assembled unit, secured to the frames of the aircraft structure.

It is an additional object of the present invention to provide a fireproof insulation material which has the qualities of thermal insulating, sound-absorbing, fire-shielding and draping across accidentally created cracks, punctures, and/or holes in the aircraft structure, so that the harmful effects from open fires, smoke, etc., can be prevented from entering the interior of the aircraft cabin.

It is an additional and most important object of the present invention to provide a material which will enhance the safety of passengers and cargo during a crash landing by having the functional quality of being able to shield the passengers or cargo from harmful fires, gases, smoke, etc. which might occur during a crash landing.

In general the present concept relates to a method of installing insulation material in an aircraft wall fuselage structure for obtaining a fire-stop shield by the steps of folding the insulation material in an accordion pleated or corrugated fashion and inserting the pleated material in the wall fuselage space with the pleats alternately directed towards the interior wall and exterior skin and securing the material outside edges, which are parallel with the pleats, onto the wall fuselage.

Thus, a crash-protective, fire-stop insulating wall structure for aircraft is being disclosed and claimed in the present patent application, which wall structure comprises an outer skin forming the outer wall and an interior panel forming the inner wall of the wall structure. The outer and inner walls are separated respectively by a plurality of spaced apart vertically and circumferentially extending frames and thereupon mounted substantially perpendicularly extending, spaced apart, stringers. Furthermore, a thermal, fire-resistant and sound-absorbing insulation blanket or unit being formed in an accordion pleated, corrugated or zigzag fashion, and having the ability to expand laterally by unfolding throughout the limits imposed by its longitudinal stretched-out length, is disposed with the space between the inner and outer wall so that the successive pleated or corrugated insulation fire-stop material is positioned with its ridges to the inner wall and the outer wall alternately, whereby the ridges will run parallel with the frames so that further separation of the frames from one another will induce a foldout of the insulating fire-stop material thereby preventing an open connection between the interior and exterior of the aircraft.

Besides the objects mentioned above, this invention provides many other objects, advantages and features which will become fully apparent from the following detailed description taken in conjunction with the accompanying drawings which illustrate and clarify the preferred embodiment of the invention.

THE DRAWINGS

DESCRIPTION OF THE INVENTION

Figure 1:
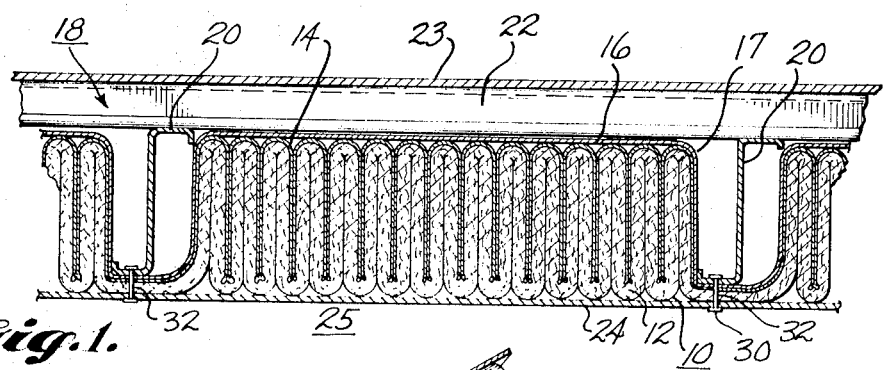
FIG. 1 is a cross section of a conventional wall structure used in aircraft wherein the interior wall space is provided with the fire-stop insulation material as disclosed.
Figure 2:
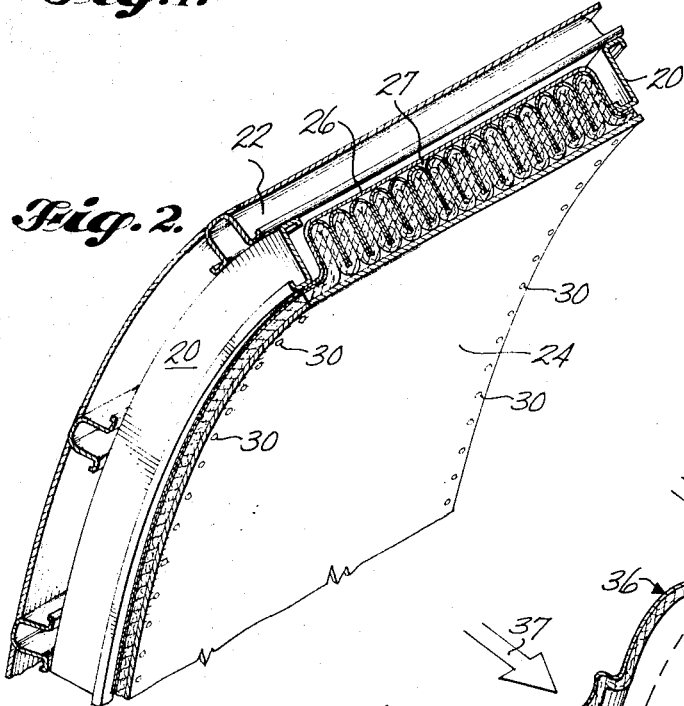
FIG. 2 is an isometric view of a section of an aircraft wall structure which shows in particular the positions of the outer skin, stringers and frames as well as how the fire-stop insulation material is secured within the interior wall space.

Referring more particularly to FIG. 1 and FIG. 2, the fire-stop insulation 10 comprises a body of fluffy material 12 such as balsa wood pulp, glass wool, cotton, and/or other required fiber materials, but still of a quality that provides a thermal insulation and/or sound absorption. In addition, the material 12 has been covered at least on one side with a fire-protective material 14, such as astro-quartz or the like. The fire-stop insulation material 10 is folded in accordion pleated or corrugated sections and may be enveloped by a paper or easy-tear type material 16 so as to aid in handling the material as well as easing the installation procedure and for keeping the folded-up blanket in a suitably fitting unit 17.

Figure 3:
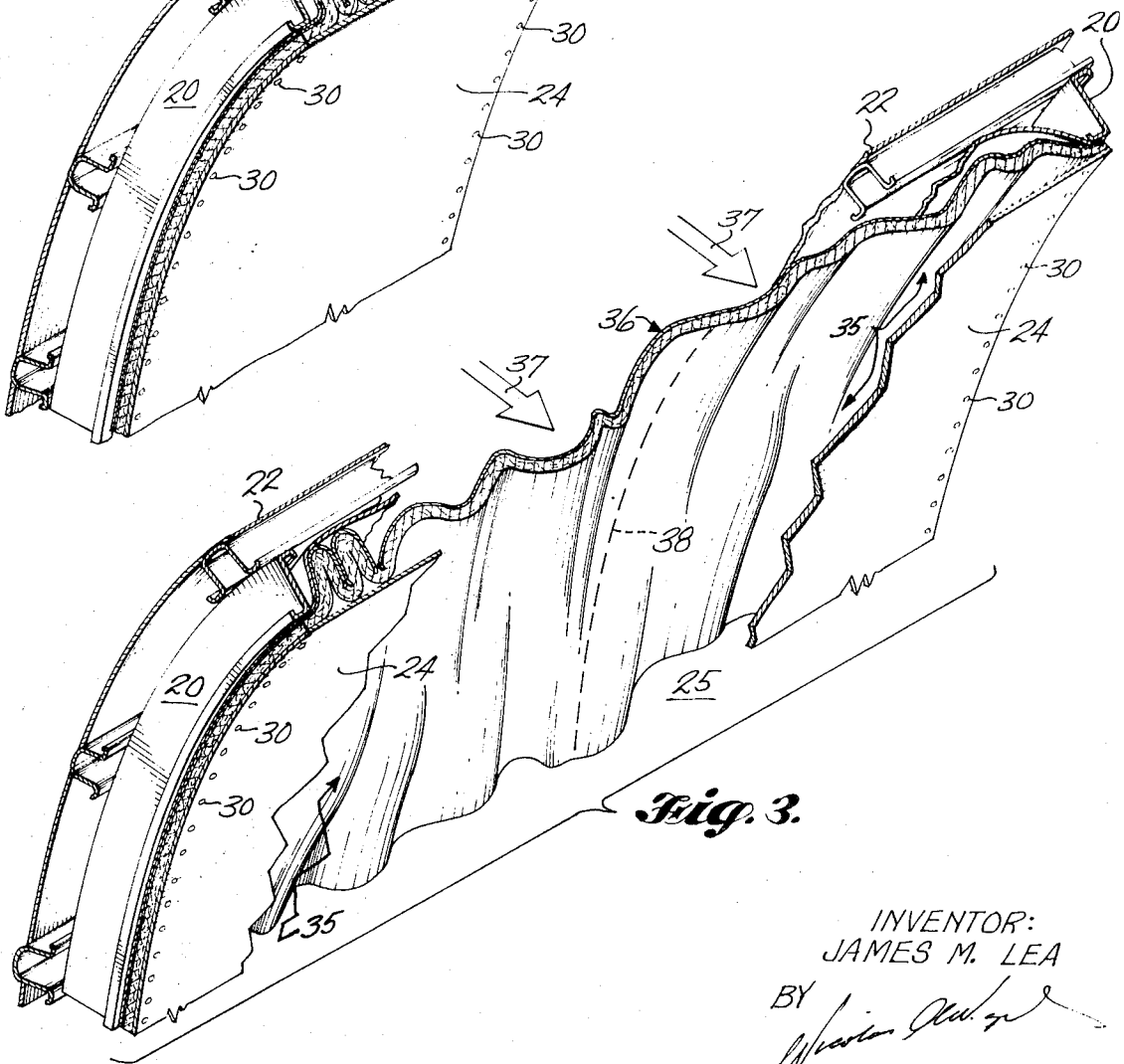
FIG. 3 shows a crash landing condition of the aircraft wherein the outer wall structure has been torn apart and the fuselage opened. The fire-stop insulation material is unfolded in an active position of shielding and preventing flames and smoke from entering the interior of the aircraft.

A typical aircraft wall structure 18 is illustrated in FIGS. 1 to 3, wherein the frame members 20 form the circumferential body support ribs of the aircraft and the stringers 22 are substantially perpendicularly mounted on the frames to form the airplane body structure and to support the outer skin or fuselage 23. The typical wall structure 18 is on the interior side covered by a lightweight panel 24 which forms the inside wall of the cabin area 25. Since the fire-stop insulation material 10 must be secured between the frames 20, it is suggested in the preferred embodiment as illustrated in FIGS. 1—3, using fasteners 30 and spacers 32, which would secure the panel 35 and the fire-stop insulation material 10 simultaneously against the frames 20. However, various fastening techniques can be used. For instance, the material 10 may even be flattened or compressed between the frames 20 and panel 24 or two units 17 may be fastened by overlapping (not shown) their end portions at the frames 20 and panel 24 junction. As shown further, the ridges 26 of the accordion pleated or corrugated fire-stop material 10 are directed toward the outer skin or fuselage 22 and are extending parallel to the frames 20.

Of course, the wall structure in aircraft is not the same at all locations and there are places where the structure is interrupted by a window or a door. In such cases, it is suggested that wherever the fire-stop insulation material 10 passes between the window (not shown) and a circumferential frame 20, it will be necessary to compress the material 12 locally in order to get the full unit 17 past the window area. Since the material 12 can be compressed easily, installation procedures around windows or doors will not cause any problems or difficulties. It is suggested, however, that when possible, the windows should be located adjacent to the frames 22, which will allow the unit to extend for one full length along the window location or obstruction. During a crash the aircraft body will most likely crack, puncture or break at the weakest point. And since windows and doors in aircraft are assembled within web and frame assemblies that produce a structurally stronger area and junction, the rupturing will occur at a plain or structually uncomplicated wall section, such as the one illustrated in FIGS. 1—3.

Referring now to FIG. 3 in particular, there is illustrated a severe break up of the fuselage 23, as may occur in a typical crash landing. The wall structure 18 is broken along an irregular path 35 and the fuselage 23, stringer 22 and inner panels 24 are torn, broken, and so on. The fire-stop insulation material 10 is not broken, but pulled and unfolded, thereby acting as a drape or cover 36. Eventually occuring external fires smoke and/or other dangerous gases or fluids will try to enter the cabin area 25 as shown by the arrows 37.

It will be obvious that the fire-stop insulation materials 10 will be of great value in occurrences described above.

It will also be understood that the existing conventional insulation materials and their installation methods are of little benefit during aircraft crashes or accidents and also will melt and practically speaking offer no protection at all to the inside cabin area when exposed to outside fire and flame conditions. It is felt that the fire-stop insulation material 10 is in its accordion pleated corrugated condition most successful during aircraft crashes where the skin is punctured or cracked. However, this does not mean that the material is not of use during severe accidents. It is hoped and expected that even when a body section is torn completely apart, and the center of the blanket is made the weakest point by perforation or some other means 38, there would be a 15-foot section of blanket which theoretically would drape over the open ends of the fuselage or body sections and thus the material 10 would still be of great value to passengers, crew and cargo during such unfortunate conditions.

It should be realized that another fastening method of the fire-stop insulation material 10, a different direction of the pleats when installed as well as a different folding configuration of the blanket can be visualized.

For wall constructions where exceptional destruction in the vertical as well as in the horizontal direction can be expected, a fire-stop insulation material can be used which consists of two blankets of fire-stop insulation material positioned with their ridges perpendicular toward one another. Also a fire-stop insulation material that is corrugated in both directions, in other words, a lateral corrugation and corrugation perpendicular to the lateral corrugation, could be used, which will be secured at the corners only.

It will be apparent to those skilled in the art that the above mentioned variations may be made without departing from the scope of the invention as defined in the appended claims.

I claim:
1. A crash protective insulating wall structure for aircraft comprising:
   a. an outer wall forming said aircraft exterior skin;
   b. a plurality of spaced apart stringers connected to said skin;
   c. a plurality of spaced apart frames disposed in substantially perpendicular relationship with said stringers and connected therewith;
   e. an inner wall forming said aircraft interior surface;
   f. an insulation blanket having fire resistant qualities disposed between said frames in an accordion pleated fashion with its pleats parallel to said frames; and
   g. fastening means securing said interior inner wall together with said insulation blanket onto said frames so that said accordion pleated insulation material between said frames is adapted to unfold throughout limits imposed by said insulation blanket longitudinal length between two frames when said two frames are accidentally separated so that said aircraft interior remains shielded from said aircraft exterior.

2. A crash protective insulating wall structure for aircraft as claimed in claim 1, wherein said insulation material is provided with a weakened center portion disposed parallel to said pleats so that tearing control of said material under extreme frame separation circumstances is achieved.